INVENTOR.
EAN LEE BUSH

Patented Sept. 23, 1947

2,427,710

UNITED STATES PATENT OFFICE 2,427,710

TRANSMISSION AND STEERING MECHANISM

Ean Lee Bush, San Francisco, Calif.

Application November 21, 1944, Serial No. 564,462

13 Claims. (Cl. 180—43)

1

This invention relates to a transmission and steering device.

The primary object of the invention is to provide a transmission or driving mechanism for vehicle wheels in such a manner as to permit the turning of the wheels without interfering with the transmission of driving power to the wheels.

Another object of the invention is to provide a driving mechanism so combined with the supports of the traction wheels of a vehicle as to permit steering through the same traction wheels.

Another object of the invention is to provide for the pivotal mounting of traction wheels of an automobile and a mechanism for transmitting driving power to said traction wheels without interfering with the turning of said wheels for the purpose of steering.

A further object of the invention is to provide for the steering of the traction wheels of a vehicle and to adjustably connect the steering device to said traction wheels and also to transmit power to said wheels in all positions.

A further object of the invention is to provide a combination steering and driving mechanism and support for traction wheels which can be arranged in tandem, means being provided to simultaneously steer the traction wheels on the tandem units.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figure 1:
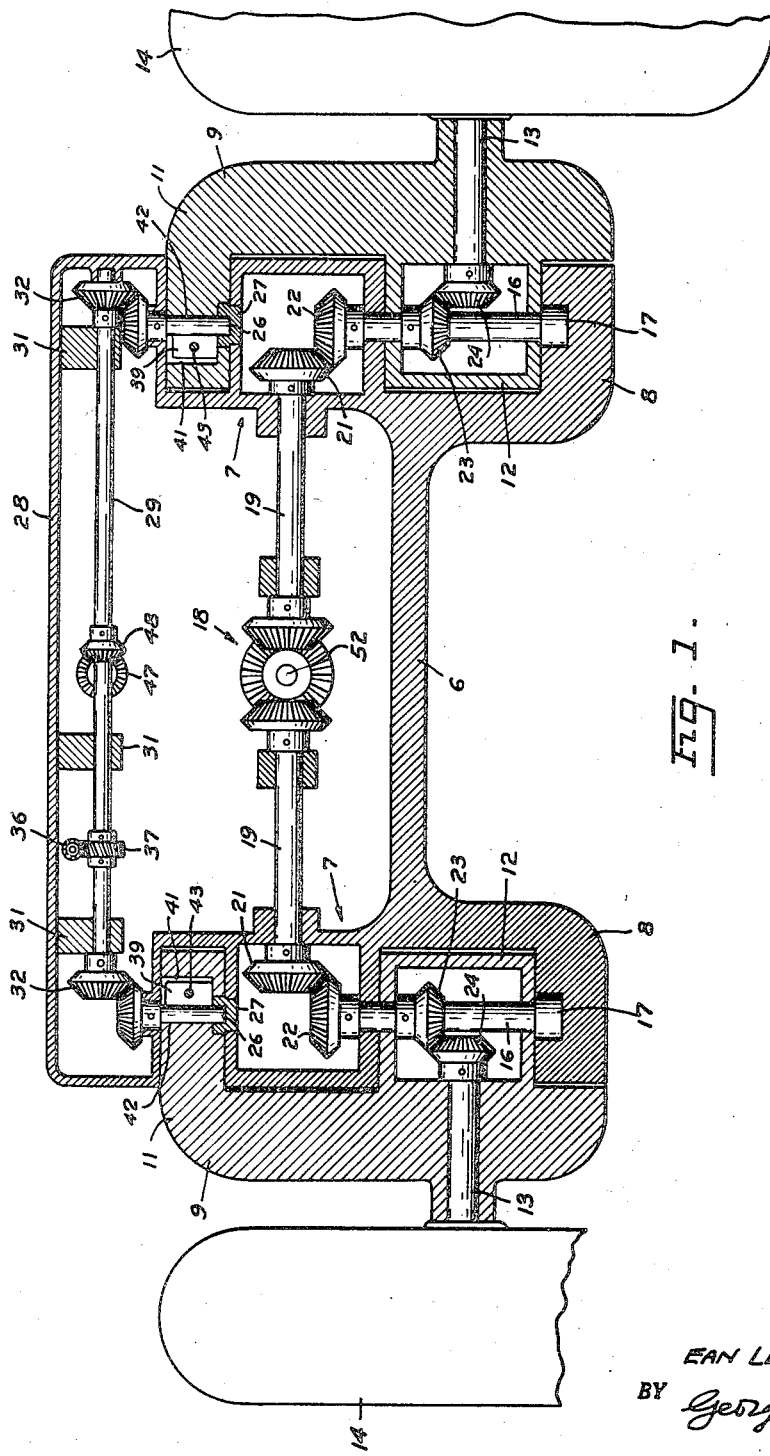
Fig. 1 is a sectional view of my driving and steering device for traction wheels.
Figure 2:
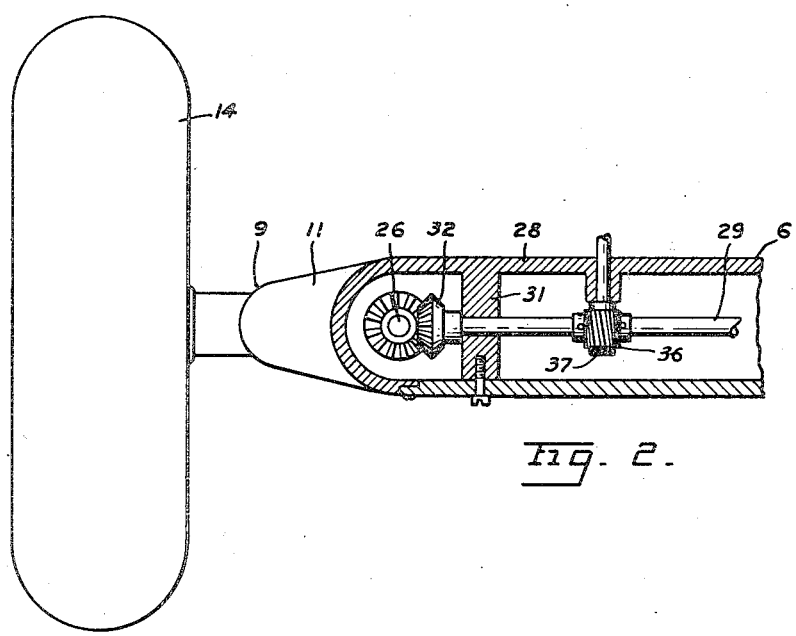
Fig. 2 is a sectional plan view showing the steering connection.

In carrying out my invention, I make use of a

2 transmission housing 6, which is suitably mounted on the frame of a vehicle, such as truck or the like, so that the housing is stationary with respect to the vehicle frame. On each side of the transmission housing is provided a journal bracket 7, each of which is hollow to provide an auxiliary transmission housing. On each side of the housing is a downwardly and outwardly extending ear 8 which is spaced from and aligned with the journal bracket 7 on the same side.

A steering knuckle 9 is formed substantially as a yoke, namely it has thereon an arm 11, and an axle housing 12 spaced from the arm 11 so that when the knuckle 9 is in position, the axle housing 12 is between the journal bracket 7 and the ear 8, and the arm 11 is on the top of the journal bracket 7. An axle 13 is suitably journaled and extends from the axle housing 12 through the knuckle 9. A traction wheel 14 is suitably keyed on or mounted on the axle 13.

The pivotal and driving connection between the axle 13 and the knuckle 9 and the journal bracket 7 is combined in the housing 12, and includes a substantially vertical pivot and drive shaft 16. The lower end of the drive shaft 16 is journaled in a bearing 17 in the top of the ear 8. The upper end of the shaft 16 extends through the top of the axle housing 12 and through the bottom of the hollow journal bracket 7 so that the axle housing 12 is supported on or is turnable around the shaft 16 as a pivot, although the major stresses and loads are taken by the journal bracket 7 and the ear 8, upon which the knuckle 9 rests. The engagement of the arm 11 on the top of the journal bracket 7 renders the pivoted connection still firmer.

Driving power is transmitted through a suitable transmission 18 supported in the transmission housing 6. A pair of transmission shafts 19 extend laterally from the transmission 18 into the respective journal brackets 7. Power is transmitted from each transmission shaft 19 to the drive shaft 16 by suitable gearing or the like. In the present illustration a bevel gear 21 is in constant mesh with a horizontal bevel gear 22. The first bevel gear 21 is on the shaft 19 and the second bevel gear 22 is keyed on the drive shaft 16. In the axle housing, power is transmitted from the drive shaft 16 to the axle 13 through suitable gearing or the like. In the present illustration, a bevel gear 23 on the drive shaft 16 is in mesh with a bevel gear 24 on the axle 13. Thus when the knuckle 9 is turned for the purpose of steering, the bevel gear 24 will remain in constant mesh with the drive gear 23, and the wheel 14 will be driven in all positions.

The steering of the traction wheels is accomplished by a steering device which in the present illustration is transmitted to the top arm 11 of the knuckle 9. A pin 26 is provided in the arm 11. The axis of the pin 26 in the present form is on the same vertical line as the axis of the drive shaft 16. The axis of the drive shaft 16 in turn coincides with the pivot of the knuckle 9. The lower end of each pin 26 is journaled in a bearing 27 on the top of the journal bracket 7. A steering gear housing 28 is suitably secured on the top of the transmission housing 6.

A steering shaft 29 is supported in suitable bearing brackets 31 in the steering gear housing 28 so as to extend substantially parallel with the transmission shafts 19 in the transmission housing 6. The outer ends of the steering shaft 29 are connected by suitable gearing or the like to the upper ends of the pins 26 which latter extend through the bottom of the steering gear housing 28. In this form a pair of bevel gears 32, respectively on the ends of the steering shaft 29 and on the pins 26, are in constant mesh for converting the rotation of the steering shaft 29 into turning of the pins 26 and thereby turning the knuckles 9 and the wheels 14.

Steering is accomplished by any suitable device such as a steering wheel 33 working through the usual steering column 34 and through a worm 36 and worm wheel 37. The worm wheel 37 is keyed on the steering shaft 29.

In order to facilitate adjustment of the knuckle 9 to the proper initial alignment of the wheels 14 with respect to the pivot of the knuckle 9, a key 39 is extended from each pin 26 into a vertical slot 41 formed in the arm 11 of the knuckle 9 and in one side of the hole 42 through which the pin 26 extends. The slot 41 is wider than the thickness of the key 39. A set screw 43 extends from each side of the arm 11 into the slot 41 and against the opposite sides of the key 39. By loosening one of the set screws and correspondingly tightening the other, the angle of the knuckle 9, with respect to the key 39, is adjusted to a desired initial angle.

Figure 3:
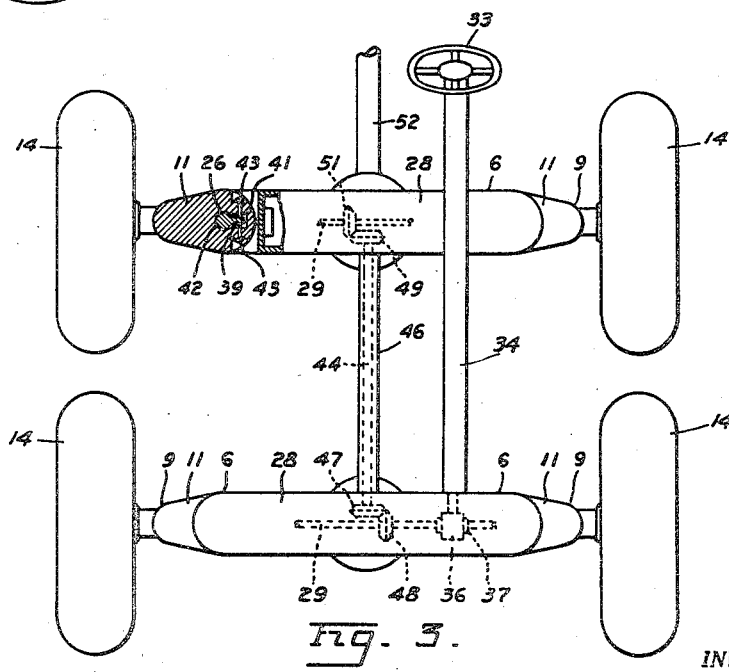
Fig. 3 is a top plan view, partly in section, of the tandem arrangement of traction wheels driven and steered according to my invention.

The tandem arrangement shown in Fig. 3 consists of 2 units of the same construction as heretofore described. The steering worm and wheel are preferably connected to the steering shaft 29 of the leading unit of the tandem. Steering action is transmitted from the leading unit to the trailing unit by a preferably flexible shaft 44 suitably journaled on a connecting tube 46 between the transmission housings of the tandem units. On one end of the flexible shaft 44 is a bevel gear 47 in mesh with another bevel gear 48 on the steering shaft 29 of the leading unit. On the other end of the flexible shaft 44 is a similar gearing connecting by bevel gears 49 and 51 respectively the rear end of the flexible shafts 44 and the steering shaft 29 of the trailing unit. The bevel gear 51 is on the opposite side of the axis of the flexible shaft 44 with respect to the first bevel gear 48 so as to turn the wheels of the tandem unit in the same direction. In this form, a power shaft 52 is extended to the transmission 18 of the trailing unit and is then extended through the tube 46 to the transmission unit 18 of the leading unit. This particular arrangement is used in connection with the front wheels of a vehicle. In the event that the rear wheels of a vehicle are also steered, then the same single or tandem arrangement may be used, except that the direction of the power shaft 52 will be toward the leading unit of the tandem.

The driving and steering of traction wheels herein described is adapted for front wheel drives of power driven vehicles. It can also be used, however, on the rear wheels whenever, for any purpose, the steering of the rear wheels is necessary. In some instances such as certain types of trucks, such as fire fighting equipment, both the front wheels and the rear wheels may have both driving and steering arrangements. The transmission device is simple, yet it provides for a firm support and true aligning of the axles, the wheels and the knuckles. It also permits easy steering and ready adjustment for the alignment of the wheels. It transmits power to the wheels in any position and while the wheels are turning. It provides efficient power transmission for the traction of such vehicles.

I claim:

1. In a vehicle wheel driving and steering mechanism, a transmission housing, a transmission in the housing, a journal bracket on each side of said housing, a steering knuckle pivoted on a substantially vertical axis on each journal bracket, an axle housing on each steering knuckle, an axle journaled in each axle housing, a wheel connected for rotation with each axle and supported on said knuckle, coacting transmission means in each bracket and in each adjacent axle housing rotatable relatively with the turning of said knuckle and connected respectively to said first transmission and to said axle for driving the respective wheels, an arm on said knuckle spaced from said axle housing and overlapping the other side of said journal bracket and a steering device connected to said spaced arm of said steering knuckles.

2. In a vehicle wheel driving and steering mechanism, a transmission housing, a transmission in the housing, a journal bracket on each side of said housing, a steering knuckle pivoted on a substantially vertical axis on each journal bracket, an axle housing on each steering knuckle, an axle journaled in each axle housing, a wheel connected for rotation with each axle and supported on said knuckle, transmission means in each bracket, transmission means in each adjacent axle housing to drive said axle, a connecting element extended from each bracket into the adjacent axle housing to transmit power between said transmission means for driving the respective wheels and to journal said knuckle on said bracket, a steering device, and means to adjustably connect the steering device to each knuckle.

3. In a vehicle driving and steering mechanism, a transmission housing, a transmission in the housing, a journal bracket on each side of the housing, a steering knuckle pivoted on each journal bracket and straddling said journal bracket, an axle housing on one part of each knuckle journaled on each journal bracket, an axle journaled in each axle housing, a wheel on each axle, a drive shaft forming part of the pivot in the journal of the axle housing and extending into said bracket and into said axle housing, a transmission connection between said transmission and said drive shaft, a drive connection between said drive shaft and said axle, and a steering device in the other straddling part of said knuckle for turning said knuckle relatively to said housing.

4. In a vehicle steering and driving mechanism, a transmission housing, a journal bracket on each side of said housing, a knuckle, an axle housing on each knuckle, an axle journaled in each axle housing overlapping one side of said bracket, a wheel driven by each axle, a transmission in the transmission housing, and means to transmit power from said transmission to said axle, including a drive shaft extended from said journal bracket into said axle housing on an axis coincident with the pivot axis of the knuckle, an element on said knuckle overlapping the other side of said bracket, and a steering device connected to said element.

5. In a vehicle driving and steering mechanism, a transmission housing, a knuckle yoke journaled on each side of the transmission housing, an axle in one branch of each knuckle yoke, a wheel driven by each axle, a transmission in the housing connected to each of said axles, an element of said transmission being coaxial with the journal of said knuckle yoke and forming the pivot for said yoke, a steering element in the other branch of said knuckle yoke and journaled on the axis of the pivot of each knuckle, an adjustable key device connecting each steering element to said knuckle at a selected knuckle angle with respect to the knuckle pivot, and a steering mechanism for turning said steering element and said knuckles together.

6. In a vehicle transmission and steering mechanism, a transmission housing, a bearing bracket extended from each side of the transmission housing, a yoke extended over each bracket and being journaled thereon, one arm of said yoke being formed into an axle housing, an axle in the axle housing, a wheel on each axle, each bearing bracket being hollow, a transmission in the transmission housing, transmission means in each hollow bracket and in each axle housing connected to one another and to said first transmission and drivingly and pivotally connected to said axles, and a steering connection in the other arm of said yoke being pivoted on said bracket.

7. In a vehicle transmission and steering mechanism, a transmission housing, a bearing bracket extended from each side of the transmission housing, a yoke extended over each bracket and being journaled thereon, one arm of said yoke being formed into an axle housing, an axle in the axle housing, a wheel on each axle, each bearing bracket being hollow, a transmission in the transmission housing, transmission means in each hollow bracket and in each axle housing connected to one another and to said first transmission and drivingly and pivotally connected to said axles, a steering pin extended through the other arm of said yoke, and a key device connecting the steering pin to said arm being adjustable for setting the angle of the arm with respect to said pin.

8. In a vehicle transmission and steering mechanism, a transmission housing, a journal bracket on each side of the housing, a knuckle yoke straddling each journal bracket, an axle housing formed in one of the arms of said knuckle yoke, an axle journaled in said axle housing, a wheel on each axle, a pivot shaft journaled in said axle housing and in said bracket to pivot said knuckle yoke, a transmission in said transmission housing, means to transmit power from said transmission to said pivot shaft, means to transmit power and rotation from said pivot shaft to said axle, and means to connect the knuckle yokes to a steering device.

9. In a vehicle transmission and steering mechanism, a transmission housing, a journal bracket on each side of said housing, another bracket extended from each side of said housing spaced from the journal bracket, a knuckle yoke straddling each journal bracket and extending between said journal bracket and the adjacent spaced bracket and being turnable thereon, an axle housing formed on said yoke and overlapping said journal bracket, a pivot shaft extended through said axle housing and into said journal bracket and journaled in said spaced bracket for forming the pivot of said knuckle yoke, an axle extended laterally from said axle housing, a wheel on each axle, a transmission in said transmission housing, means to transmit power from said transmission to said pivot shaft, means to transmit power from said pivot shaft to said axle, a steering element secured to each yoke and journaled on said journal bracket, and means to connect said steering elements to a steering device.

10. In a vehicle transmission and steering mechanism, a transmission housing, a journal bracket on each side of said housing, another bracket extended from each side of said housing spaced from the journal bracket, a knuckle yoke straddling each journal bracket and extending between said journal bracket and the adjacent spaced bracket and being turnable thereon, an axle housing formed on said yoke and overlapping said journal bracket, a pivot shaft extended through said axle housing and into said journal bracket and journaled in said spaced bracket for forming the pivot of said knuckle yoke, an axle extended laterally from said axle housing, means to transmit power from said pivot shaft to said axle, a steering element in each yoke, means to adjustably connect the steering element to said yoke for turning the yoke, and means to connect said steering elements to a steering device.

11. In a vehicle transmission and steering mechanism, a transmission housing, a knuckle journaled on each side of said transmission housing, an axle housing formed on each knuckle, an axle journaled in and extended from each knuckle, a wheel on each axle, a transmission in the transmission housing, an axle driving transmission in the axle housing, a pivotal driving connection pivoted about an axis substantially coinciding with the pivot axis of the knuckle and connecting said transmissions, a steering housing on said transmission housing, a steering element extended from said steering housing substantially co-axially with said pivotal connection into each knuckle for turning said knuckles, a steering mechanism in each steering housing connected to said steering elements, and means to connect each steering element to its knuckle.

12. In a vehicle transmission and steering mechanism, a transmission housing, a knuckle journaled on each side of said transmission housing, an axle housing formed on each knuckle, an axle journaled in and extended from each knuckle, a wheel on each axle, a transmission in the transmission housing, an axle driving transmission in the axle housing, a pivotal driving connection pivoted about an axis substantially coinciding with the pivot axis of the knuckle and connecting said transmission, a steering housing on said transmission housing, a steering element extended from said housing substantially co-axially with said pivotal connection into each knuckle for turning said knuckles, a steering mechanism in each steering housing connected to said steering elements, and adjustable means to connect each steering element to its knuckle at selected angle with respect to the knuckle pivot.

13. In a transmission and steering mechanism for vehicle wheels, a pair of transmission housings arranged in tandem, a transmission in each transmission housing, a drive connection between the trasmissions extended from one housing to the other for transmitting power from one transmission to the other, knuckles pivoted on the opposite sides of each housing, an axle in each knuckle, a wheel on each axle, means in each transmission housing to transmit power from the respective transmissions to the respective axles, a steering element secured to each knuckle for transmitting turning movement thereto, a steering transmission on each transmission housing connected to the adjacent steering elements, a steering device connected to one of said steering transmissions for operating the same, and means extended from one steering housing to the other and connected to said steering transmissions to transmit steering movement from the steering transmission operated by said steering device to the other steering transmission.

EAN LEE BUSH.

REFERENCES CITED

The following references are of record in the file of this patent:

UNITED STATES PATENTS

| Number | Name | Date |
| --- | --- | --- |
| 1,245,715 | Hartline | Nov. 6, 1917 |
| 1,364,398 | Martin et al. | Jan. 4, 1921 |
| 1,371,859 | Carpenter | Mar. 15, 1921 |
| 1,388,004 | Schmit | Aug. 16, 1921 |
| 1,296,216 | Reif | Mar. 4, 1919 |
| 1,340,759 | Duncan | May 18, 1920 |